United States Patent [19]

Chapman et al.

[11] 3,929,492

[45] Dec. 30, 1975

[54] SURFACE TREATING COMPOSITIONS

[75] Inventors: Francis E. Chapman; Robert F. Grant, both of Racine, Wis.

[73] Assignee: S. C. Johnson & Son, Inc., Racine, Wis.

[22] Filed: Nov. 6, 1972

[21] Appl. No.: 303,900

Related U.S. Application Data

[63] Continuation-in-part of Ser. No. 202,599, Nov. 26, 1971, abandoned.

[52] U.S. Cl. .................... 106/3; 106/10; 106/271; 106/287 SB; 252/305
[51] Int. Cl. ....... C08h 9/08; C09g 1/08; C09g 1/14
[58] Field of Search ............ 106/10, 287 SB, 271, 3; 252/305

[56] References Cited
UNITED STATES PATENTS

| | | | |
|---|---|---|---|
| 3,073,706 | 1/1963 | Treboux | 106/10 |
| 3,393,078 | 7/1968 | Lockhart | 106/10 |
| 3,395,028 | 7/1968 | Mackles | 106/10 |

OTHER PUBLICATIONS

Detergents & Specialties, May 1969, "Formulating Modern Furniture Polishes," W. Hackett, pp. 54, 58, & 137.

Farbwerke Hoechst AG W102/1.58 Hoechst Wax N New and W95/1.57 Wax Emulsifier 2106.

S. C. Johnson & Son, Inc., "International Raw Material" Specification 7/73.

*Principles of Aerosol Technology,* Paul A. Saunders, 1970, pp. 178, 188, 190.

*Primary Examiner*—Theodore Morris

[57] ABSTRACT

Self-pressurized surface treating compositions comprising a water-in-oil emulsion containing wax and/or silicone, water and a liquified normally gaseous propellant.

9 Claims, No Drawings

SURFACE TREATING COMPOSITIONS

CROSS REFERENCE TO OTHER APPLICATION

This application is a continuation-in-part of our application Ser. No. 202,599, filed Nov. 26, 1971 now abandoned.

FIELD OF INVENTION

This invention relates to novel surface treating compositions. More specifically, this invention relates to self-pressurized surface treating compositions comprising a water-in-oil emulsion wherein a liquified normally gaseous propellant is substantially the only solvent present.

DESCRIPTION OF THE PRIOR ART

It has heretofore been generally known to employ wax or oil containing formulations as an aid to cleaning and maintaining the appearance of hard surfaces such as furniture. Such formulations have been prepared and used in various forms, including pastes, solutions, lotions, creams and as emulsions. For many areas of application, it has been found desirable to provide a polish formulation in a self-pressurized container. With all types of polish formulations, however, several problems have been encountered. One such problem is the amount of the formulation that is absorbed into the polishing cloth when the cloth is rubbed on the furniture and therefore is not deposited on the furniture. Another problem is the visible wax build-up and hazy or smeary appearance on the surface of the furniture which results from the necessity of frequent applications of the formulations in order to maintain an acceptable shine on the surfaces.

A particular shortcoming of pressurized formulations heretofore used is that it has generally been considered necessary to include in them an organic solvent, typically a naphtha, kerosene or isoparaffinic solvent. Such solvents have been deemed especially essential in wax containing emulsions for the formation of a workable water-in-oil emulsion and to prevent agglomeration and sedimentation of the wax particles. These solvents typically impart an undesirable odor to the product and increase the amount of buffing and rubbing which must be done in applying it, since a satisfactory gloss will not be developed until almost all of the solvents has evaporated or soaked into the cloth.

Another problem with existing pressurized polish formulations is the sensitivity of the films deposited to water-spotting. Moreover, the films which they produce cannot readily be re-buffed between applications to restore the gloss and cover scratches or marks. Although pressurized water-in-oil emulsions have been referred to, for example, in U.S. Pat. No. 2,524,590 to Boe, U.S. Pat. No. 3,159,535 to Sesso, U.S. Pat. No. 3,395,028 to Mackles, U.S. Pat. No. 3,553,123 to Behnke, U.S. Pat. No. 2,907,664 to Schoenholz, Canadian Pat. No. 704,385 to Fowks and Herzka, Pressurized Packaging (Aerosols), pages 205-218 Academic Press, 1961, no formulation has been disclosed which solves all of the problems noted above.

SUMMARY OF THE INVENTION

It is, therefore, an object of the present invention to provide novel self-pressurized surface treating compositions characterized by good deposition on the surface being treated and a long lasting and easy to care for shine.

Other objects of the present invention will be set forth in, or be apparent from the following detailed description of the invention.

The novel compositions of this invention are self-pressurized water-in-oil emulsions consisting essentially of one or more surface coating or polishing agents, water, and liquified normally gaseous propellant. The compositions are essentially solvent-free, i.e. the liquified normally gaseous propellant constitutes essentially the entire liquid portion of the continuous phase. The liquified normally gaseous propellant serves both as propellant and as the exterior phase of the emulsion. The ability to dispense completely with or drastically reduce the amount of the known commercial solvents minimizes the odor, toxicity and other problems normally encountered with their use. The surface treating compositions of the present invention contain surface treating agents and propellant in carefully controlled amounts and possess the desirable qualities of ease of deposition and ease of maintenance of the resulting shine, thereby avoiding excessive build-up since repeated reapplications are not required. In preferred embodiments, the compositions produce films which resist water-spotting and which can be buffed to rejuvenate the shine, avoiding the necessity of repeated applications.

In general, these compositions will contain surface coating agent in the range of about 0.1 to 10% by weight and propellant in the range of about 7.5 to 80% by weight of the total composition. The surface coating agent will be silicone or a mixture of silicone and wax.

The silicones which may be employed in the practice of the invention are organic polysiloxanes, including polydialkyl siloxanes and polyalkyl aryl siloxanes. Polysiloxanes such as dimethyl polysiloxane, diethyl polysiloxane, methyl ethyl polysiloxane, methyl phenyl polysiloxane, and copolymers of two or more of such siloxanes are exemplary of the materials which can be used. Dimethyl polysiloxane is especially preferred. Polysiloxanes having viscosities in the range of about 5 to 50,000 centistokes can be employed, with viscosities of the order of 100 to 1,000 centistokes being preferred. The total quantity of silicones utilized in the compositions should be about 0.5% to 10% by weight of the total composition with a preferred range of from 1-6% and a most preferred range of 2-4%.

The wax which can be used in the present invention may be any predominantly hydrocarbon aliphatic material of high molecular weight including natural and synthetic waxes, ester-type waxes, microcrystalline wax, petroleum wax, and synthetic resinous materials such as polyethylene and polypropylene. Of the ester-type waxes, the most preferable include candelilla wax and carnauba wax. The present invention may have, as constituents, one or a combination of two or more of the aforementioned waxes within the range of 0.1-5% by weight of the total composition, preferably about 0.5-2.5%. For best resistance to water-spotting, the wax used in this invention should have a melting point below 200°F, and in preferred embodiments this surface treating composition utilizes a microwax having a melting point between about 150°F and 175°F.

Anionic, cationic and non-ionic emulsifiers can be successfully utilized in the practice of this invention. The only requirements are that the emulsifier is compatible with the other components and that it produces a water-in-oil emulsion. As is well-known, certain emulsifiers will produce water-in-oil emulsions in one environment and oil-in-water emulsions in another. The applicability of a specific emulsifier may, however, be readily tested in accordance with known procedures. For example, the presence or absence of a water-in-oil emulsion can be determined by testing the capacity of the composition to conduct a current. Water-in-oil emulsions, as is well-known, do not conduct electricity.

Emulsifiers of the nonionic type have been found to be particularly suitable in promoting the emulsification of the oil and water phases and for preventing coalescence of the dispersion in the final composition. Emulsifiers which have been found especially suitable for the practice of this invention are long-chain, fatty acid esters of polyhydroxylic compounds, such as the glycol, glycerol and sorbitol esters of oleic, stearic, palmitic and lauric acids. Ethoxylated fatty acids and amides are also useful. Representative examples of such emulsifiers include sorbitan monooleate sold by Atlas Chemical Industries under the trademark "SPAN 80", sorbitan monolaurate sold by Atlas Chemical Industries under the trademark "SPAN 20", sorbitan monopalmitate sold by Atlas Chemical Industries under the trademark "SPAN 40", ethoxylated stearic acid sold by Armour under the trademark "ETHOFAT 60/15", polyglycerol oleate sold by Emulsol Chemical Corp. under the trademark, "EMCOL 14" and the like. Mixtures of the above emulsifiers can also be utilized, if desired.

For additional enhancement of the properties of this invention and to provide for a more stable emulsion, it is often desirable to include a small percentage of a general purpose water-soluble emulsifier, although the compositions containing only a water-in-oil emulsifier are also satisfactory. The quantity of water-soluble emulsifier should be about 1–12% of the amount of the aforementioned oil-soluble emulsifiers for best results. In such manner, the interaction of the two emulsifiers produces a more stable emulsion. In the preferred embodiment of this invention, the water-soluble emulsifier will be a non-ionic polyethylene oxide adduct such as the non-ionic emulsifier sold by Atlas Chemical Industries under the trademark "TWEEN 80". The total quantity of emulsifier used in the compositions should be approximately 0.1% to 3% by weight of the total formulation, depending upon the amount of material to be emulsified. It is generally desirable to use the lowest effective quantity of emulsifier, since excessive emulsifier may produce cloudy or streaky films on the treated surface.

In the compositions of the present invention, the propellant has a dual function as both a means of expulsion of the composition from its container and as the principal component of the continuous phase of the emulsion. Although applicants do not intend that this invention be bound by any theory, it is believed that after the composition is expelled from its container a portion of the propellant is, surprisingly, retained for a sufficient period of time to facilitate application of the formulation and to remove oil-soluble stains from the treated surface. This residual propellant then evaporates quickly, resulting in a breaking of the emulsion and a deposition of the surface modifying components, e.g., the wax and silicones. This provides a quick-forming desirable gloss which is long lasting and which can be rejuvenated by buffing between applications. Moreover, since the propellant evaporates much more quickly than the conventional naphtha-type solvent heretofore used, a high percentage of the wax and silicone are deposited on the surface rather than being soaked into the polishing cloth along with residual solvent.

In the most preferred embodiments of the invention, those containing wax as at least a portion of the surface coating agent, the compositions can be totally free of organic solvents. However, where the composition does not contain wax it is desirable to use a very small quantity of a paraffinic, non-aromatic, organic hydrocarbon solvent, having a boiling point between about 60° and 150°C, such as a petroleum distillate, naphtha, isoparaffin solvent, Stoddard solvent, deodorized kerosene, hexane, heptane, etc. The reason for using this small amount of organic solvent is to facilitate the formation of the water-in-oil emulsion. When wax is included in the formulation, it is preferably blended with the water emulsifiers prior to the addition of the liquified gaseous propellant. The wax aids in the formation of the desired emulsion when the propellant is added. If no wax is present, for example when the only surface coating agent employed is a silicone oil, it is more difficult to form the desired water-in-oil emulsion. The addition of a small amount of organic solvent, typically less than 6% by weight of the composition, and preferably 2 to b 4 %, supplies the small amount of organic oil phase needed to achieve smooth formation of the emulsion. These small amounts of organic solvent may also be used when wax is present in the formulation; they are, however, not necessary in those circumstances.

The propellants used in this invention are liquified normally gaseous propellants. Preferred propellants are the hydrocarbon liquid normally gaseous propellants including propane, isopropane, butane, isobutane and mixtures thereof. The preferred hydrocarbon propellants are butane and isobutane. Halogenated hydrocarbon propellants such as chlorodifluoromethane, difluoroethane, dichlorodifluoroethane and the like can also be used. Blends of two or more propellants can be used. The propellant should be present in sufficient amount to expel the entire contents of the container, as well as to function as the solvent in the emulsion and, therefore, should be present in an amount of from about 7.5–80%, preferably about 12–20%.

The composition will also contain water as the principal constituent of the dispersed phase. The water aids in the leveling of the film, and removes water-soluble soil present on the surface to be treated. Generally, water will make up the balance of the composition, taking into account the active ingredients noted. It may also be desirable to include, in minor amounts, certain elements which enhance the characteristics and qualities of the composition. As specific examples, small amounts of fragrances are employed to impart pleasing scents to the composition. Preservatives, typically formaldehyde, are used to retard bacterial growth in the container and to prolong the shelf life of the product.

The self-pressurized surface treating composition, in accordance with this invention, may be conveniently produced by the following method. Any wax or waxes, silicone or silicones to be included, the emulsifiers and any fragrance are mixed together. If a wax is included, the mixture is heated to a temperature above the melting point of the wax. This mixture is then transferred to a suitable pressure vessel or directly to the aerosol containers and sealed. Some or all of the liquified normally gaseous propellant or propellant blend is then added to this mixture with good agitation. The aqueous components and any additional additives are then heated to a temperature of about 140–160°F and added with continued agitation, resulting in the formation of an emulsion. The resulting mixture is then cooled by suitable means to room temperature and additional propellant is added, if desired.

An alternative procedure for preparing the surface treating compositions of the present invention comprises preblending any wax or waxes, silicone or silicones, emulsifiers, any fragrance and the water and then placing this mixture in a suitable pressure vessel or container. The liquified normally gaseous propellant or propellant blend is then added with agitation resulting in the formation of an emulsion. The resulting mixture is then cooled by suitable means to room temperature and additional propellant is added, if desired.

Specific embodiments of self-pressurized surface treating compositions, prepared in accordance with the present invention, are illustrated by the following representative examples. It will be understood, however, that the invention is not confined to the specific limitations set forth in the individual examples, but rather to the scope of the appended claims.

EXAMPLE I

A self-pressurized surface treating composition is prepared by heating silicone oil, waxes and emulsifiers to a temperature of 165°F and stirring until all of the wax present melts. Preheated water and formaldehyde at a temperature of 165°F is then added and the mixture is placed in an aerosol container with a conventional valve and said container is then pressure filled with liquified normally gaseous n-butane resulting in the following composition:

|  | % by weight |
| --- | --- |
| SPAN 80 | 0.80 |
| TWEEN 80 | 0.06 |
| Formaldehyde (37%) | 0.20 |
| Silicone Oil (500 cstk.) | 2.35 |
| Silicone Oil (1000 cstk.) | 0.25 |
| n-butane | 30.00 |
| Paraffin wax | 0.15 |
| Lemon wax | 0.05 |
| Microwax | 0.66 |
| Water | balance to 100 |

EXAMPLE II

An intermediate composition is prepared by heating waxes, silicone oils, emulsifiers and 10% of the water to a temperature of 150°F in a closed pressure vessel. Liquified normally gaseous n-butane is then pressure filled into the vessel slowly maintaining a temperature of 140°F. Preheated water and formaldehyde at a temperature of 140°F is then added with agitation. The vessel is then rapidly cooled to a temperature of about 60°F resulting in the following intermediate composition:

|  | % by weight |
| --- | --- |
| SPAN 80 | 0.80 |
| TWEEN 80 | 0.06 |
| Formaldehyde | 0.50 |
| Silicone Oil (500 cstk.) | 2.35 |
| Silicone Oil (1000 cstk.) | 0.25 |
| n-butane | 30.00 |
| Paraffin wax | 0.15 |
| Lemon wax | 0.05 |
| Microwax | 0.66 |
| Water | balance to 100 |

90 parts of the above prepared intermediate composition are then mixed with 10 parts of a propane/isobutane mixture (70:30) to form a surface treating composition which is characterized by good surface deposition and a long lasting shine which can be rejuvenated by buffing and which resists water-spotting.

When 88 parts of the above prepared intermediate composition are mixed with 12 parts of a propane/isobutane mixture (70:30) and when 85 parts of the above prepared intermediate composition are mixed with 15 parts of a propane/isobutane mixture (70:30), substantially equivalent results are obtained in that a desirable surface treating composition is formulated.

EXAMPLE III

An intermediate composition is prepared by heating the waxes, silicone oils, emulsifiers and fragrance to a temperature of about 180°F in a pressure vessel. After the waxes have melted, the water and formaldehyde preheated to a temperature of 170°F are added with agitation. The remainder of the water and "Carbopol" are added to form the following intermediate composition:

|  | % by weight |
| --- | --- |
| SPAN 80 | 0.885 |
| TWEEN 80 | 0.115 |
| Silicone Oil (500 cstk.) | 2.150 |
| Silicone Oil (5 cstk.) | 0.150 |
| Microwax | 0.700 |
| Refined Paraffin | 0.250 |
| Fragrance | 0.150 |
| Formaldehyde | 0.200 |
| CARBOPOL 941 (1% of aqueous solution) | 3.000 |
| Water | balance to 100 |

85 parts of the above prepared intermediate composition are then mixed with 15 parts of a propane/isobutane mixture (70:30) to form a surface treating composition.

The intermediate from the above examples may be utilized with varying amounts and types of propellants as illustrated by the following examples:

|  | % by weight Intermediate | % by weight Propellant |  |
| --- | --- | --- | --- |
| EXAMPLE IV | 92.5 | 7.5 | CF₂Cl₂ |
| EXAMPLE V | 85 | 15 | CF₂Cl₂/isobutane mixture 10:90 |
| EXAMPLE VI | 60 | 40 | isobutane |
| EXAMPLE VII | 20 | 80 | n-butane |

Similarly, other modifications in the formulation can be made. For example, the "TWEEN 80" and the 5 cstk. silicone oil can be omitted.

EXAMPLE VIII

A polish formulation having the following composition is prepared:

|  | % by weight |
|---|---|
| SPAN 80 | 0.48 |
| TWEEN 80 | 0.02 |
| Silicone Oil (500 ctsk.) | 2.00 |
| Mineral Spirits | 1.00 |
| Perfume | 0.17 |
| Water | 82.33 |
| n-Propane | 9.8 |
| Isobutane | 4.2 |

The water is placed in pressurized containers and the other ingredients, except for the n-propane and isobutane, are added. The containers are sealed, and the n-propane and isobutane are added, under pressure, with blending of the composition and formation of the water-in-oil emulsion taking place simultaneously with the propellant addition.

What is claimed is:

1. A self-pressurized surface treating composition comprising a water-in-oil emulsion consisting essentially of about 0.1 to 5% wax, about 0.5 to 10% organic polysiloxane, about 7.5 to 80% of at least one liquified normally gaseous propellant, and water, the continuous phase of said emulsion being free of solvent other than said propellant, and wherein said propellant is selected from the group consisting of liquified normally gaseous hydrocarbon propellants, liquified normally gaseous halogenated hydrocarbon propellants and mixtures thereof.

2. The composition of claim 1 which contains a water-in-oil emulsifier selected from the group consisting of sorbitan monooleate, sorbitan monolaurate, sorbitan monopalmitate, ethoxylated stearic acid, polyglycerol oleate and mixtures thereof.

3. The composition of claim 1 wherein the wax has a melting point below 200°F.

4. The composition of claim 1 wherein the liquified normally gaseous propellant is a hydrocarbon propellant.

5. The composition of claim 1 wherein the liquified normally gaseous hydrocarbon propellant is butane or isobutane.

6. The composition of claim 1 wherein the organic polysiloxane is a dialkyl siloxane having a viscosity of about 5 to 50,000 centistokes.

7. The composition of claim 1 containing from about 0.5 to 2.5% wax, about 1.0 to 6.0% organic polysiloxane and about 12 to 20% of at least one liquified normally gaseous propellant.

8. A self-pressurized surface treating composition comprising a water-in-oil emulsion consisting essentially of about 0.1 to 10% of a surface coating agent selected from the group consisting of (i) organic polysiloxane, and (ii) wax with organic polysiloxane, about 7.5 to 80% of at least one liquified normally gaseous propellant, water, and when said surface coating agent does not contain wax, an organic, paraffinic hydrocarbon solvent having a boiling point between about 60°C and 150°C in an amount not greater than 6%; and wherein said propellant is selected from the group consisting of liquified normally gaseous hydrocarbon propellants, liquified normally gaseous halogenated hydrocarbon propellants, and mixtures thereof.

9. The composition of claim 8 wherein said surface coating agent is a dialkyl silicone having a viscosity of about 5 to 5,000 centistokes and said organic, paraffinic hydrocarbon solvent is present in the amount of about 2–4%.

* * * * *